US010272751B2

(12) United States Patent
Heidan

(10) Patent No.: US 10,272,751 B2
(45) Date of Patent: Apr. 30, 2019

(54) ROOF SYSTEM FOR A MOTOR VEHICLE

(71) Applicant: Michael Heidan, Stuttgart (DE)

(72) Inventor: Michael Heidan, Stuttgart (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/795,309

(22) Filed: Oct. 27, 2017

(65) Prior Publication Data

US 2018/0118001 A1 May 3, 2018

(30) Foreign Application Priority Data

Nov. 2, 2016 (DE) .................. 10 2016 221 484

(51) Int. Cl.
*B60J 7/00* (2006.01)
*B60R 13/07* (2006.01)
*B62D 25/07* (2006.01)

(52) U.S. Cl.
CPC ............ *B60J 7/0084* (2013.01); *B60R 13/07* (2013.01); *B62D 25/07* (2013.01)

(58) Field of Classification Search
CPC .......... B60J 7/0084; B60R 13/07; B62D 25/07
USPC .................................... 296/213; 52/11–16
See application file for complete search history.

(56) References Cited

U.S. PATENT DOCUMENTS

| 4,971,386 | A | * | 11/1990 | Bohm | ........................ | B60J 7/05 |
| | | | | | | 296/213 |
| 6,644,728 | B1 | * | 11/2003 | Nagashima | ............... | B60J 7/022 |
| | | | | | | 296/213 |
| 6,648,405 | B2 | | 11/2003 | Bunsmann et al. | | |
| 8,899,875 | B1 | * | 12/2014 | Bramble | ................. | E04D 13/08 |
| | | | | | | 405/119 |

FOREIGN PATENT DOCUMENTS

| DE | 1 199 147 B | 8/1965 |
| DE | 100 53 530 A1 | 7/2001 |
| DE | 201 11 650 U1 | 10/2001 |
| DE | 10 2007 017 136 A1 | 10/2008 |
| JP | 4-266526 A | 9/1992 |
| JP | 3505313 * | 3/2004 |
| JP | 2006-151205 A | 6/2006 |
| JP | 2015-13582 A | 1/2015 |

OTHER PUBLICATIONS

Search Report of European Patent Office issued in European Application No. 17 19 7407 with English translation of category of cited documents dated Jan. 29, 2018 (9 pages).

* cited by examiner

*Primary Examiner* — Dennis H Pedder
(74) *Attorney, Agent, or Firm* — Flnn Thiel, P.C.

(57) ABSTRACT

A roof system for a motor vehicle including a support frame which supports at least one roof element, and drainage system which has at least one water gutter. The water gutter is provided at least over part of its length with a plurality of anti-surge bodies which are spaced apart from one another in the longitudinal direction of the water gutter, are each extended over a partial region of a width and/or a height of the water gutter and leave free at least a partial portion of a base of the water gutter.

12 Claims, 9 Drawing Sheets

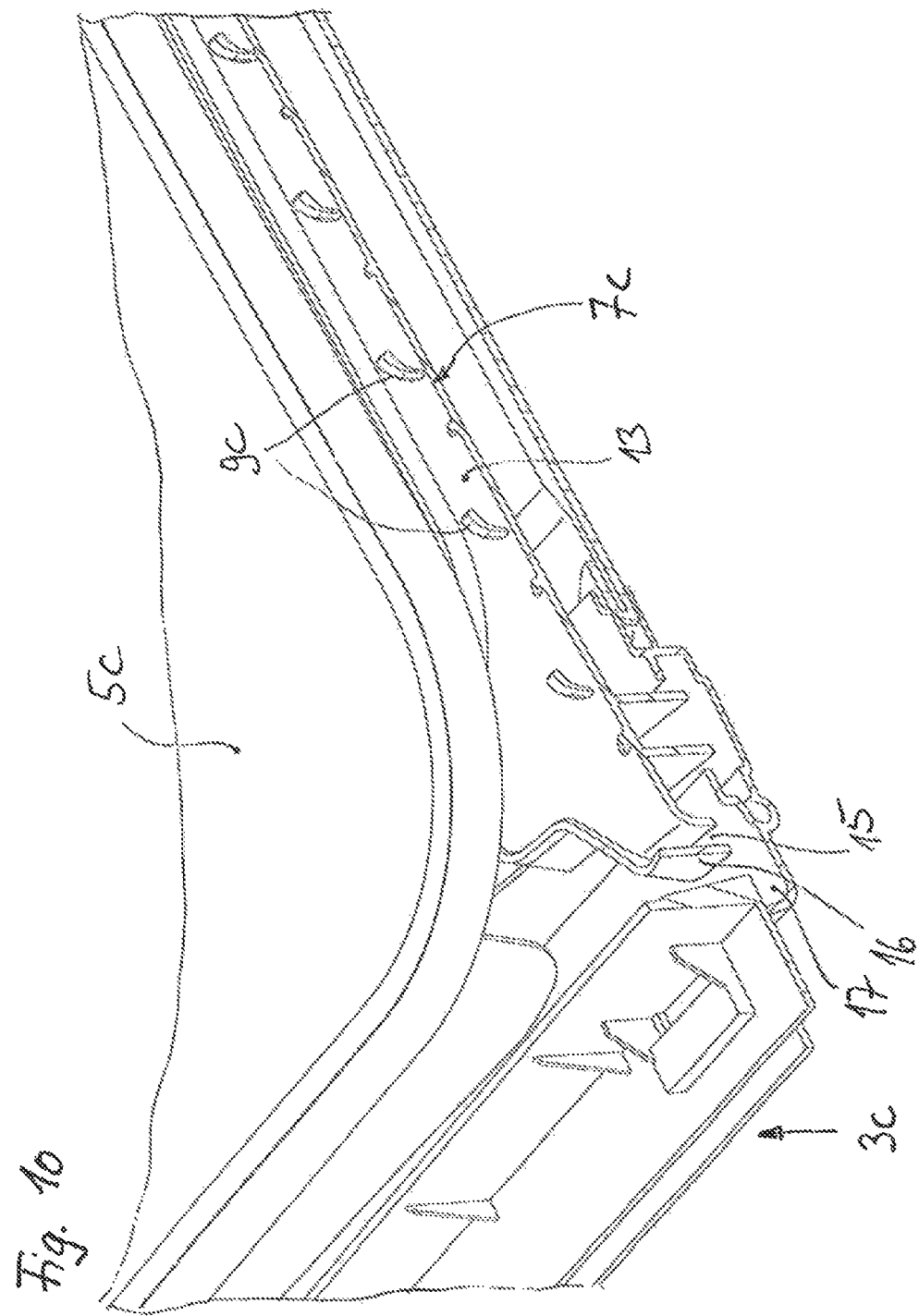

ROOF SYSTEM FOR A MOTOR VEHICLE

TECHNICAL FIELD

The invention relates to a roof system for a motor vehicle, with a support frame which supports at least one roof element, and with a drainage system which has at least one water gutter.

BACKGROUND

Roof systems of this type are known in general for passenger vehicles. Roof systems of this type are either designed as sliding roof systems, in which at least one roof element is shiftable between a position closing a roof cutout and a position opening up the roof cutout. Alternatively, the roof systems have fixed glass roof elements which are provided merely to allow more light to penetrate the vehicle interior of the passenger vehicle.

In all roof systems, a drainage system has to be provided in order to collect water which passes from the outside into the region of the vehicle roof and therefore in the region of the roof system, and to conduct said water away in a defined manner.

SUMMARY

It is the object of the invention to provide a roof system of the type mentioned at the beginning which permits improved drainage in comparison to the prior art.

This object is achieved in that the water gutter is provided at least over part of its length with a plurality of anti-surge bodies which are spaced apart from one another in the longitudinal direction of the water gutter, are each extended over a partial region of a width and/or a height of the water gutter and protrude upward from a base of the water gutter. The solution according to the invention makes it possible to avoid water in the at least one water gutter from being able to slosh out of the water gutter in the driving mode. This reliably avoids water being able to penetrate a vehicle interior of the motor vehicle or roof-side cavities of a vehicle body of the motor vehicle. The solution according to the invention is suitable both for roof systems which have at least one movable roof element, such as, in particular, sliding or lifting roof systems, and for roof systems in which the at least one roof element is fixedly connected to the support frame. The last-mentioned roof systems preferably have two glass roof elements which cannot be opened but, because of their transparency, contribute to increasing the brightness of the vehicle interior. The anti-surge bodies do not block a water flow in the direction of a discharge. Corresponding water can flow past below the anti-surge bodies or next to the anti-surge bodies, depending on the configuration of the anti-surge bodies. Said anti-surge bodies serve on the contrary merely as wave or surge breakers in order to avoid quantities of water building up to too high a level during corresponding accelerations or decelerations of the motor vehicle. The solution according to the invention ensures that accordingly water guided in the water gutter cannot escape beyond an upper edge of the water gutter. The anti-surge bodies can be formed integrally from the water gutter or produced separately and connected releasably or non-releasably to the water gutter.

In a refinement of the invention, the anti-surge bodies are designed as flow posts. The flow posts are preferably formed cylindrically and protrude upward from the base of the water gutter. The flow posts are preferably arranged centrally on the base of the water gutter such that water can flow past the flow posts on both sides.

In a further refinement of the invention, the anti-surge bodies are designed as partial barriers. The partial barriers are wall portions which extend transversely with respect to the longitudinal direction of the water gutter from one side edge of the water gutter over a partial region of a width and/or a height of the water gutter toward an opposite side. The partial barriers are designed in such a manner that a distance remains from the respectively opposite side edge of the water gutter, and therefore water can flow on one side past the partial barriers along the base of the water gutter. Alternatively, the partial barriers can also extend over an entire width of the water gutter with a gap being left free toward the base of the water gutter. Owing to the fact that, in this alternative, the partial barriers are spaced apart from the base, a sufficient water flow along the base in the direction of an outlet of the water gutter is nevertheless ensured.

In a further refinement of the invention, the base of the water gutter is carried on continuously in the longitudinal direction of the water gutter on at least one side of each anti-surge body. Accordingly, the base has a permanent, at least slight inclination in the direction of an outlet of the water gutter, and therefore water can flow permanently and continuously along the water gutter in the direction of at least one outlet.

In a further refinement of the invention, the water gutter is a fixed part of the support frame. A plurality of water gutters are preferably integrated in the support frame and are each assigned, in corner regions of the support frame, outlets which open into hose lines which lead through corresponding vehicle body pillars to a vehicle underbody in order to conduct away the water thereto.

In a further refinement of the invention, the water gutter is assigned to the roof element. The roof element can be designed as a movable roof element or as a fixed roof element. In this refinement, the at least one water gutter preferably extends in the transverse direction of the vehicle and is preferably assigned to a front or a rear end edge region of the respective roof element. In the case of a movable roof element, the water gutter is shifted together with the roof element. The water gutter can be fastened directly to the roof element or can be connected to deployment levers of a shifting mechanism for the roof element.

In a further refinement of the invention, the anti-surge bodies are designed as pimples which protrude upward from a base surface of the water gutter and are oriented in an alternating manner in different directions. The pimples are preferably formed integrally from the base surface.

In a further refinement of the invention, the pimples are oriented obliquely offset with respect to one another in an alternating manner in the longitudinal direction of the base surface of the water gutter. The pimples each extend over a partial region of a width of the water gutter such that corresponding surge water can flow past the pimples on both sides. The pimples are oriented obliquely and positioned offset with respect to one another in an alternating manner such that a deflection of the water flow and accordingly a reduction in the flow speed arises in each case. In addition, the pimples preferably cause a turbulent flow.

In a further refinement of the invention, the pimples are designed as longitudinally extended webs. The pimples are preferably curved in an opposite direction to one another in an alternating manner. Accordingly, the one web and the other webs are in each case curved in an alternating manner in the clockwise direction or counterclockwise, as seen in the longitudinal direction of the water gutter. The curvature is preferably designed in the shape of an arc.

In a further refinement of the invention, the water gutter is provided at a front end region with a discharge which is open toward a water-conducting longitudinal portion of a guide gutter of the support frame. The surge water can thereby be conducted out of the water gutter into a wet region of the support frame if the water gutter is assigned to the roof element and extends in the transverse direction of the roof element over the entire width thereof transversely with respect to the direction of longitudinal movement of the roof element.

In a further refinement of the invention, the discharge on the front end side of the water gutter is flanked by an impact wall. The impact wall stops the surge water and conducts the water into the discharge.

Further advantages and features of the invention emerge from the claims and from the description below of preferred exemplary embodiments of the invention that are illustrated with reference to the drawings.

BRIEF DESCRIPTION OF THE DRAWINGS

FIG. 10 shows, in a perspective partially sectioned illustration, the embodiment according to FIGS. 8 and 9.

DETAILED DESCRIPTION

Figure 1:
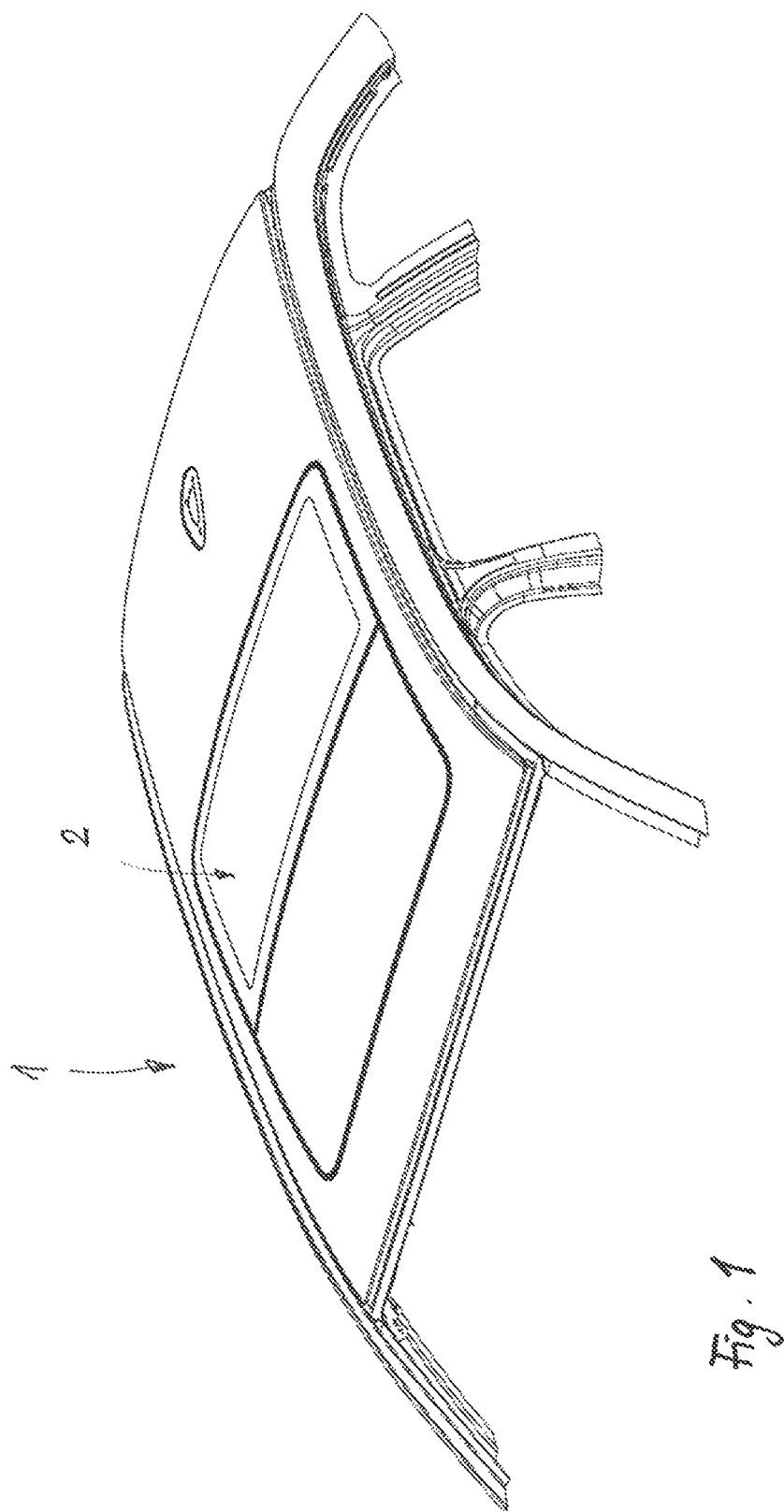
FIG. 1 shows, in a perspective illustration, a roof region of a passenger vehicle with an embodiment of a roof system according to the invention.

A passenger vehicle has, according to FIG. 1, a roof region 1 which spans a vehicle interior. Integrated in the roof region 1 is a roof system 2 which is fitted into a roof cutout of the roof region 1 and is connected fixedly to corresponding portions of a vehicle body in the roof region 1. According to FIGS. 2 to 4 and 5 to 7, the roof system 2 is in each case designed as a sliding roof system 2a, 2b, said sliding roof systems being described in more detail below with reference to FIGS. 2 to 7. The two sliding roof systems 2a, 2b correspond to the roof system 2 according to FIG. 1 and can be integrated alternatively into the roof region 1. Accordingly, the roof system 2 according to FIG. 1 is merely symbolic of the sliding roof system 2a or the sliding roof system 2b.

Figure 2:
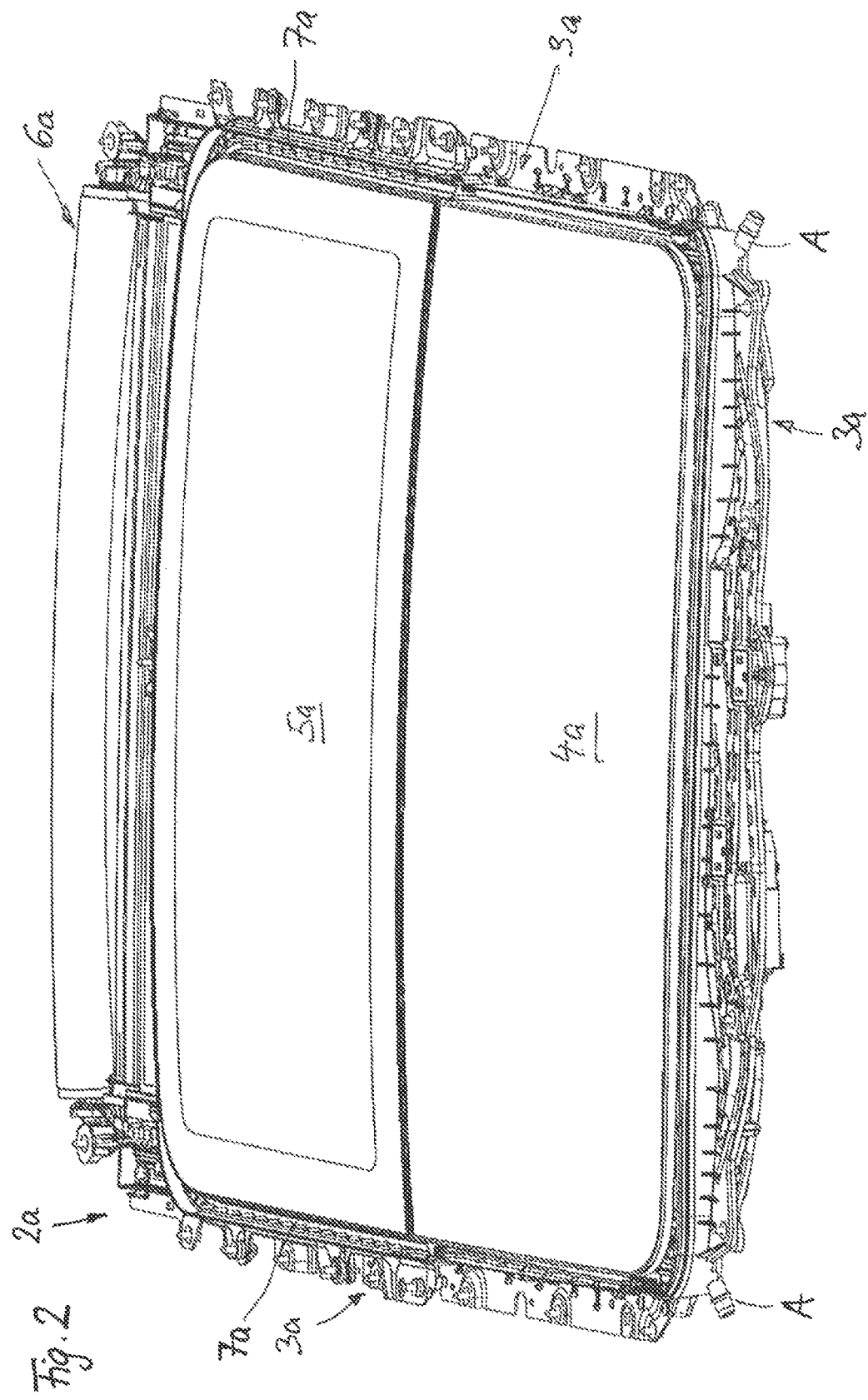
FIG. 2 shows an embodiment of a roof system according to the invention for a roof region according to FIG. 1.
Figure 3:
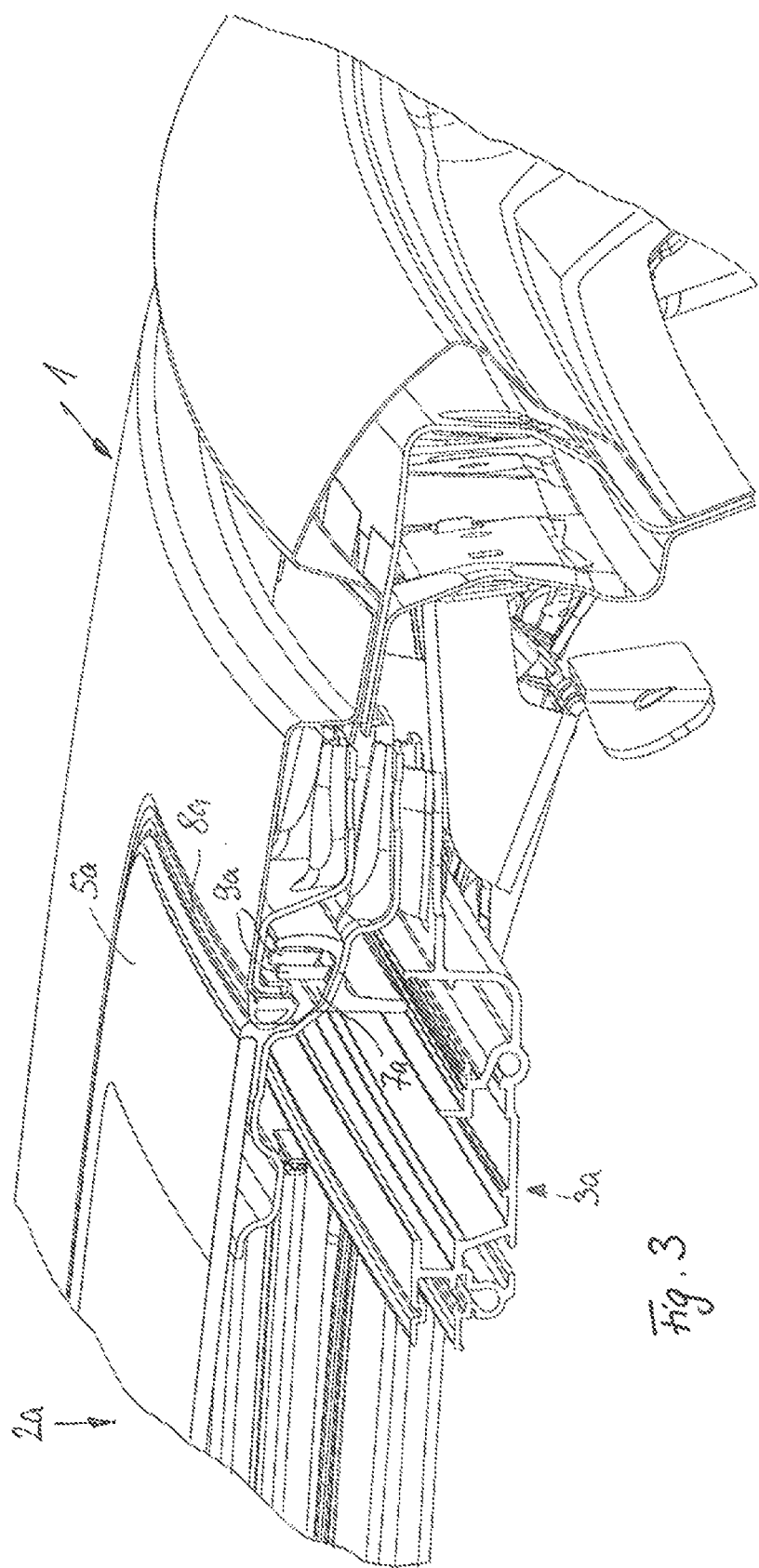
FIG. 3 shows, in an enlarged perspective sectional illustration, a detail of the roof region according to FIG. 1 with a roof system according to FIG. 2.
Figure 4:
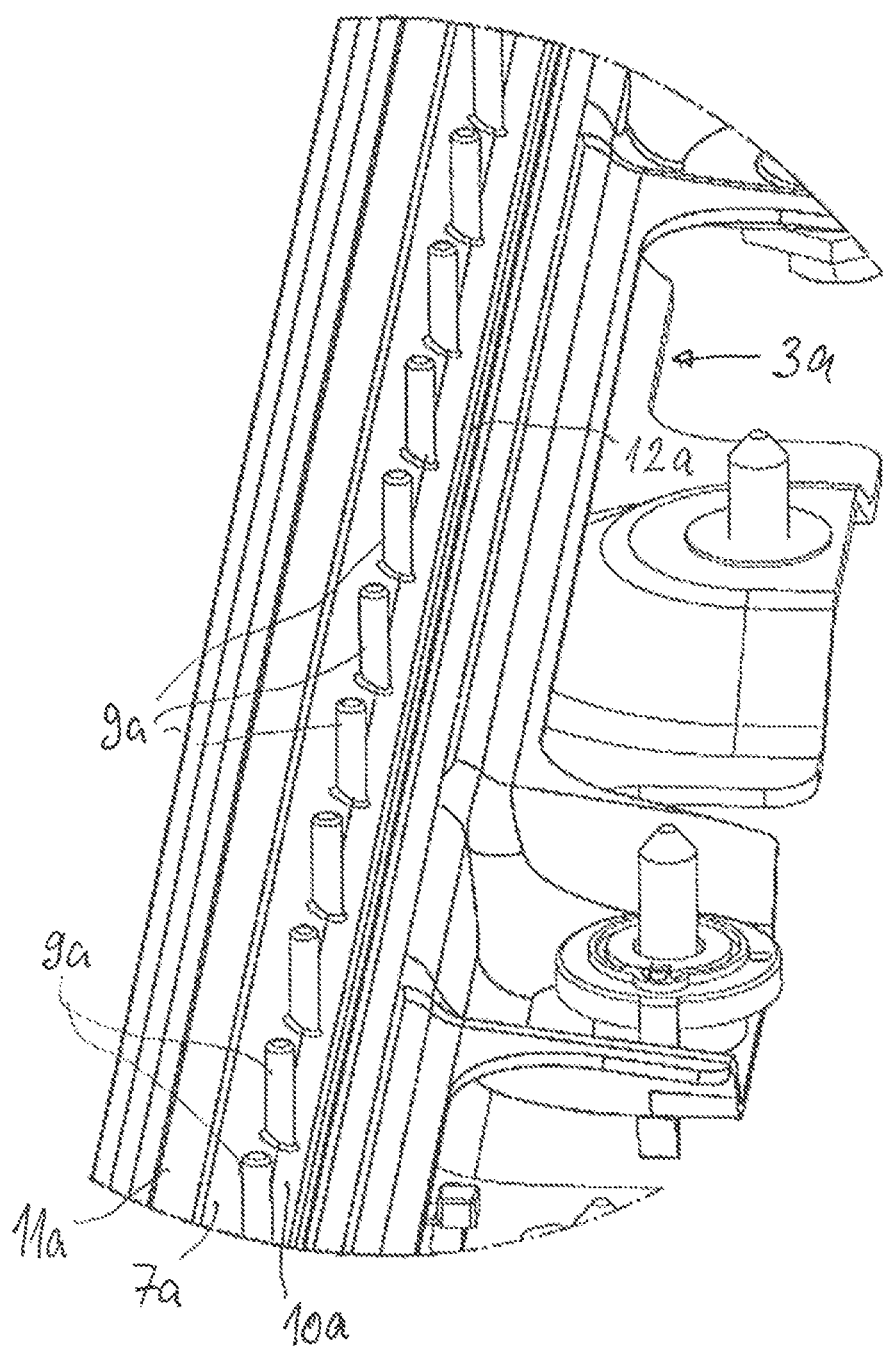
FIG. 4 shows, in an enlarged perspective illustration, a detail of the roof system according to FIGS. 2 and 3.

The sliding roof system 2a according to FIGS. 2 to 4 has a support frame 3a which bounds a roof cutout. The roof cutout of the support frame 3a is closeable by means of two roof elements 4a, 5a, of which one roof element 4a is designed as a movable roof element. The roof element 4a is transferrable by release of a partial region of the frame cutout of the support frame 3a from a closed position according to FIG. 2 into an obliquely upwardly positioned ventilation position and into an open position moved beyond the rear roof element 5a—as seen in the longitudinal direction of the vehicle. For shifting the movable roof part 4a between the closed position, the ventilation position and the open position, a drive system, not denoted specifically, is provided which is likewise integrated in the support frame 3a. At a distance behind the rear roof element 5a, a shading device 6a is fastened to the support frame 3a, the shading device permitting shading of the glass roof elements 4a, 5a on the vehicle interior side.

On its opposite longitudinal sides, the support frame 3a is provided with respective water gutters 7a which flank the roof elements 4a, 5a on opposite sides. In addition, the support frame 3a also has respective water gutters (not denoted specifically) in the region of a rear side and in the region of a front side, said water gutters merging into the water gutters 7a. The water gutters 7a are assigned outlets A which, in the fitted state of the sliding roof system 2a in the roof region 1 of the passenger vehicle, are connected to hose lines which permit water which has accumulated in the water gutters 7a to be conducted away through body pillars of the vehicle body to a lower side of the vehicle.

As can be seen with reference to FIGS. 3 and 4, the two water gutters 7a of the support frame 3a, which water gutters extend in the longitudinal direction of the vehicle, each have a base 10a and, on opposite longitudinal sides, a side wall 11a and a side wall 12a. The base 10a and the side walls 11a and 12a merge integrally into one another and define the gutter shape of the water gutter 7a.

It can also be seen with reference to FIGS. 3 and 4 that each of the two water gutters 7a is provided with a series of anti-surge bodies 9a which are arranged one behind another uniformly in the longitudinal direction of the water gutter 7a and, in the exemplary embodiment illustrated, are designed as cylindrical flow posts. The flow posts designed as anti-surge bodies 9a are arranged in a row one behind another at uniform distances from one another in the longitudinal direction of the water gutter 7a and protrude upward from the base 10a of the water gutter 7a parallel to one another in the vertical direction of the vehicle. The flow posts serving as anti-surge bodies 9a are fixedly connected to the base 10a of the water gutter 7a, in particular are formed integrally with the base 10a. The flow posts are positioned centrally between the opposite side walls 11a, 12a and have a diameter which is substantially smaller than a width of the base 10a—as seen in the transverse direction of the vehicle. Accordingly, the base 10a extends in each case on both sides of each flow post continuously in the longitudinal direction along the water gutter 7a such that possible water in the water gutter 7a can flow around the flow posts on both sides. The flow posts serving as anti-surge bodies 9a ensure that the water flow breaks within the water gutter 7a and accordingly large waves cannot build up in the longitudinal direction of the water gutter 7a. The flow posts serving as anti-surge bodies 9a each extend over an entire height of the water gutter 7a as far as an upper edge region of the side walls 11a, 12a.

Figure 5:
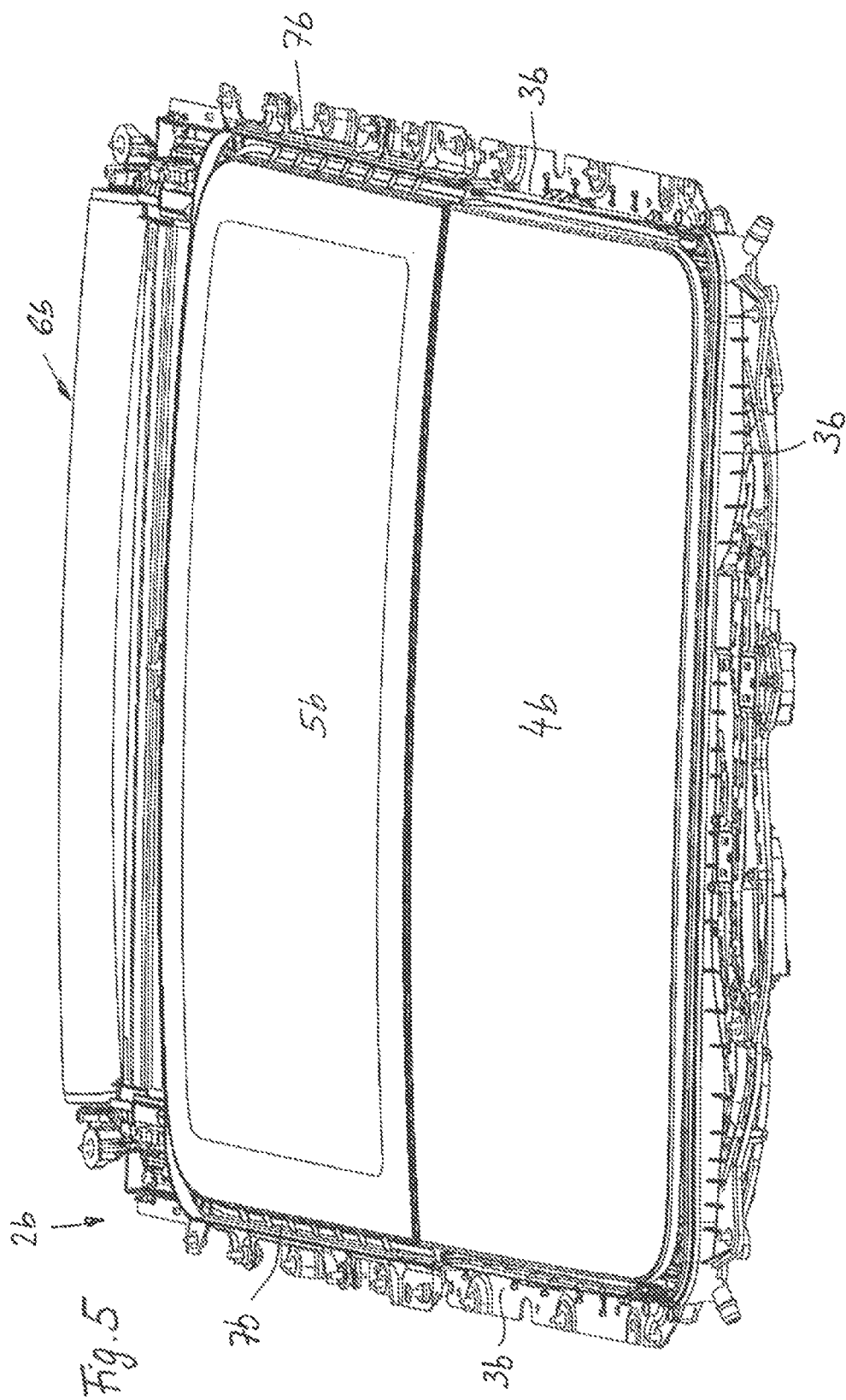
FIG. 5 shows, in a perspective illustration, a further embodiment of a roof system according to the invention for use in a roof region according to FIG. 1.
Figure 6:
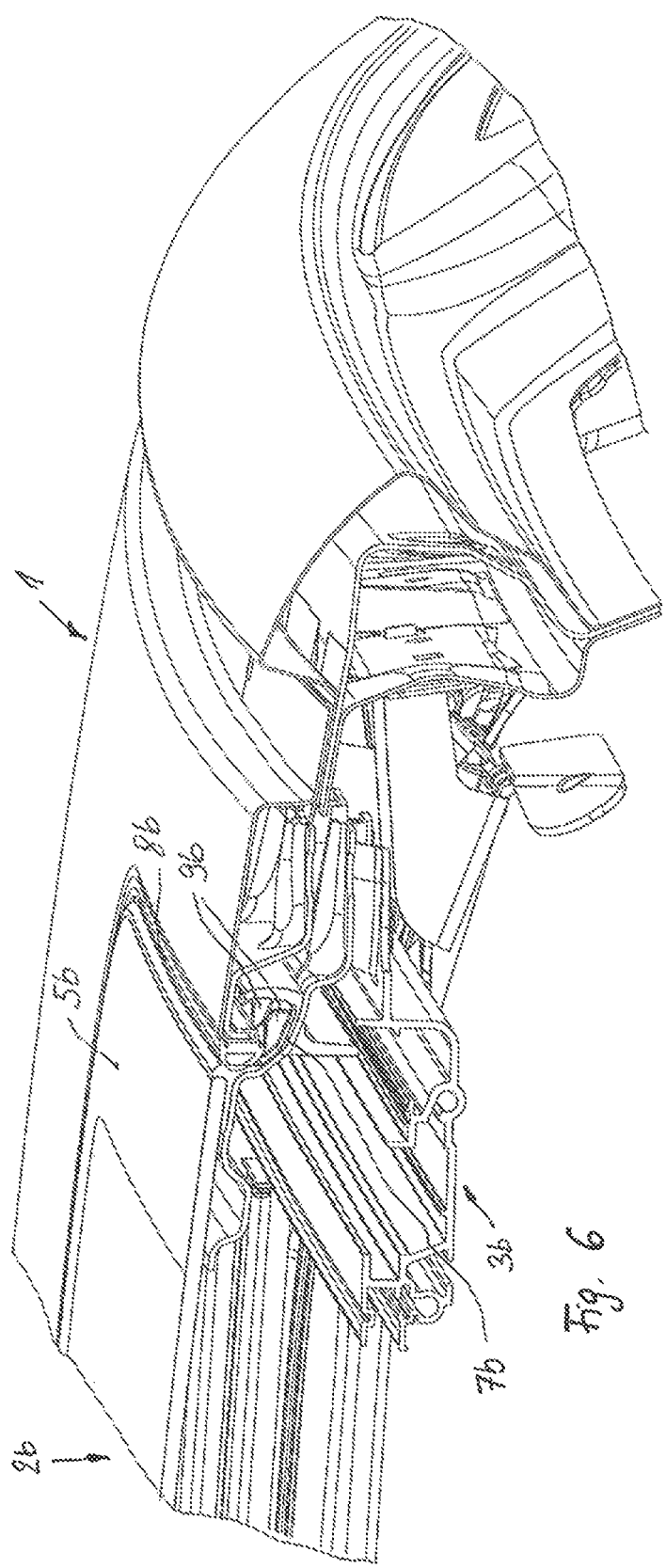
FIG. 6 shows, in an enlarged perspective illustration, a cross section through the roof region according to FIG. 1 with an embodiment of a roof system according to the invention according to FIG. 5.
Figure 7:
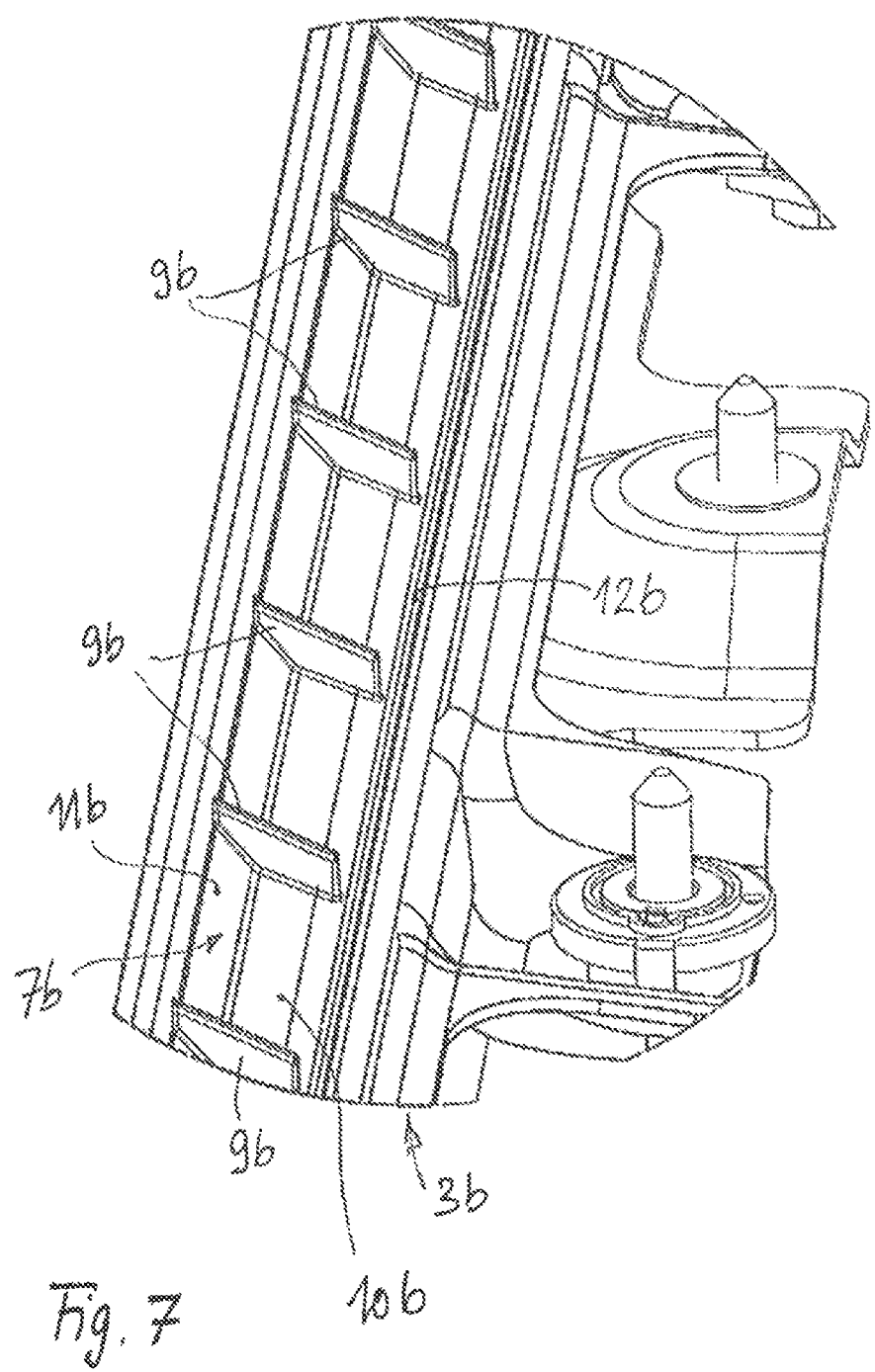
FIG. 7 shows, in an enlarged illustration, a detail of the roof system according to FIG. 5.

The sliding roof system 2b according to FIGS. 5 to 7 substantially corresponds to the sliding roof system 2a described previously with reference to FIGS. 2 to 4. In order to avoid repetitions, only the differences of the sliding roof system 2b in comparison to the sliding roof system 2a according to FIGS. 2 to 4 are therefore discussed below. Functionally identical parts and portions of the sliding roof system 2b are provided with the same reference signs with the letter a being exchanged for the letter b. A substantial difference of the sliding roof system 2b according to FIGS. 5 to 7 is that the water gutters 7b which are provided in the longitudinal direction on opposite sides of the support frame 3b are provided with anti-surge bodies 9b which are designed differently to the anti-surge bodies 9a, which are designed as flow posts, of the sliding roof system 2a.

As can be readily seen with reference to FIGS. 6 and 7, the anti-surge bodies 9b are designed as partial barriers. The partial barriers are formed by transverse webs which extend from the one side wall 11b over a partial region of the width of the water gutter 7b transversely with respect to the longitudinal direction of the water gutter 7b. Each partial barrier adjoins the left side wall 11b in FIG. 7 and ends at a distance from the right side wall 12b in FIG. 7. By this means, the base 10b of the water gutter 7b extends continuously past each partial barrier, as a result of which corresponding water in the water gutter 7b can flow along the base 10b between the respective partial barrier and the right side wall 12b in FIG. 7. The partial barriers form ridge-shaped transverse walls which adjoin the left side wall 11b in FIG. 7 and the base 10b in a continuously flush manner over an entire height of the water gutter 7b. The partial barriers are preferably integral with the water gutter 7b.

The partial barriers are arranged distributed at uniform distances from one another over a partial region of a length of the water gutter 7b and are oriented parallel to one another in the transverse direction of the vehicle. The partial barriers protrude upward at right angles to the base 10b of the water gutter 7b. Chambers for flowing water arise between the adjacent partial barriers, the chambers braking the water flow and therefore serving as surge breakers. In particular in the event of decelerations or accelerations of the passenger vehicle that act in the longitudinal direction of the vehicle, water flowing in the longitudinal direction of the vehicle in the respective water gutter 7b is prevented from building up wavy quantities of water, and therefore corresponding water cannot escape over corresponding side walls 11b, 12b of the respective water gutter 7b.

Figure 8:
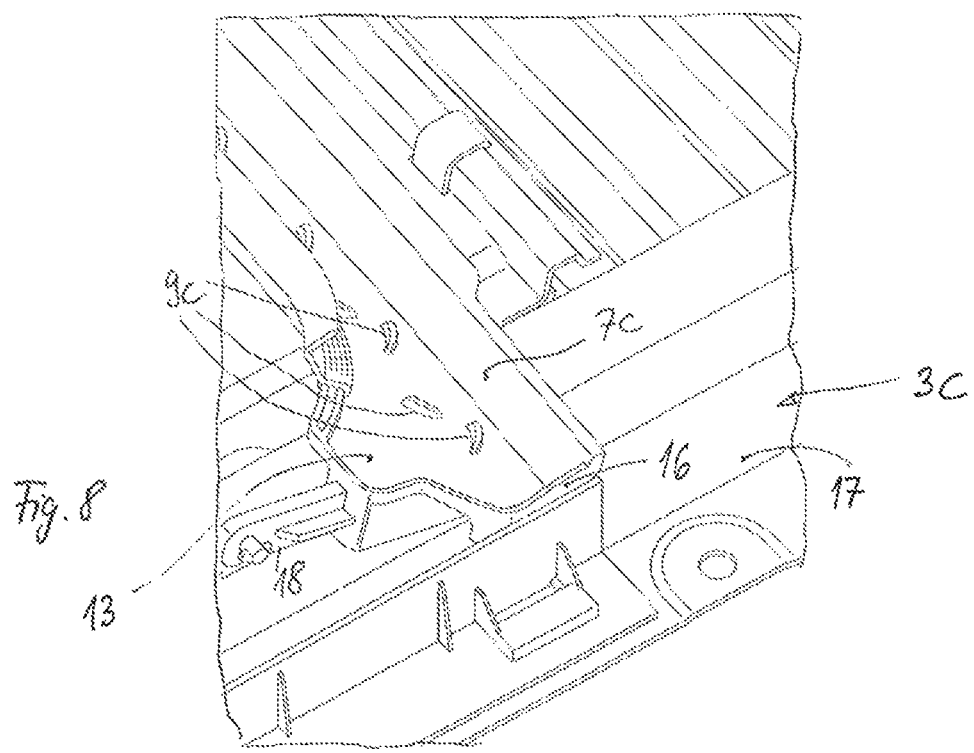
FIG. 8 shows part of a further embodiment of a roof system according to the invention with a water gutter assigned to a movable roof element.
Figure 9:
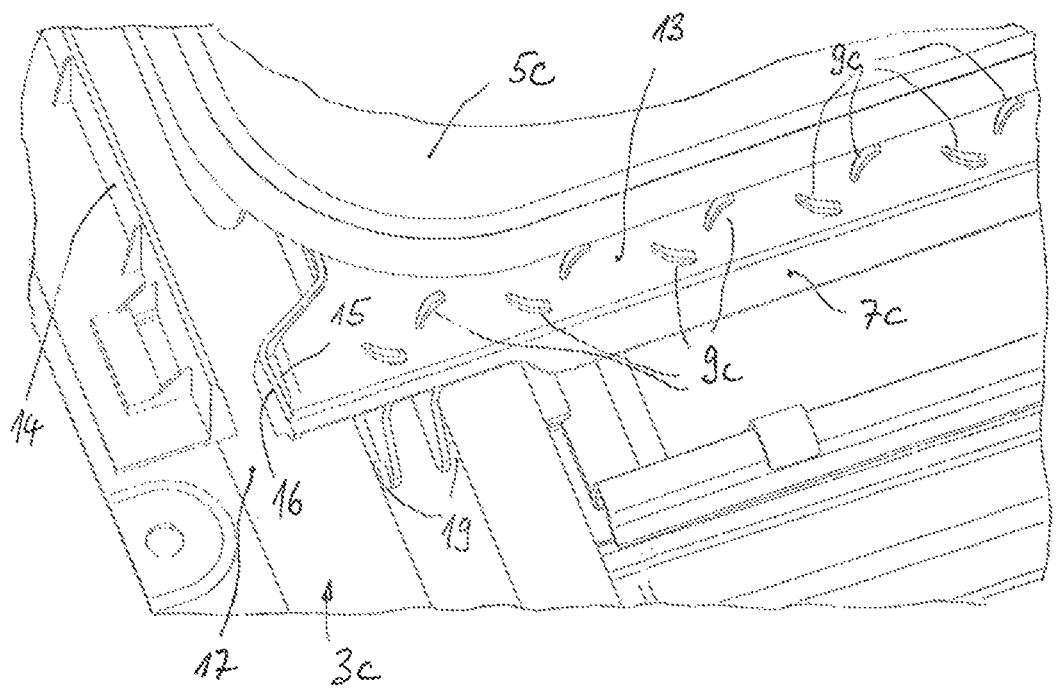
FIG. 9 shows, in another perspective illustration, the embodiment according to FIG. 8.

A roof system according to FIGS. 8 to 10 has a roof element 5c which is shiftable on both sides by means of a shifting mechanism along two guide rail arrangements which are integrated in the support frame 3c. The guide rail arrangements are provided on opposite longitudinal sides of the support frame 3c and are components of the support frame 3c. Each shifting mechanism in each case has a rear deployment lever 18 which is provided for raising, lowering and longitudinally shifting the roof element 5c. At the two rear deployment levers 18, of which only a left deployment lever 18—as seen in the normal direction of travel—is shown with reference to FIGS. 8 and 9, a water gutter 7c extends in the transverse direction of the roof system. The water gutter 7c is positioned below a rear end edge of the movable roof element 5c and extends—in the longitudinal direction of the roof system—beyond a rear end edge of the roof element 5c in order to be able to trap water which has accumulated on the roof element 5c. It can be seen with reference to FIGS. 8 and 9 that the water gutter 7c is in each case provided at its opposite end regions with fastening profilings (not denoted specifically), by means of which the water gutter 7c is connected to the respective deployment lever 18. The fastening profilings extend on the rear side (see FIG. 9) as far as a pivot joint 19 of the rear deployment lever 18. The respective rear deployment lever 18 is guided in a longitudinally shiftable manner in the corresponding guide rail arrangement. In order to shift the respective shifting mechanism, a drive system is provided as has already been explained previously with reference to the embodiments according to FIGS. 1 to 7.

Laterally outside the guide rail portion for the respective shifting mechanism, each guide rail arrangement has a water-conducting longitudinal portion 17 which can be readily seen with reference to FIGS. 8 to 10. The water gutter 7c is provided at the one end region (see FIGS. 8 to 10) with a discharge 15 which is flanked on the end side of the water channel 7c by an impact wall 16 which defines an end edge region of the water gutter 7c. The discharge 15 is open toward the water-conducting longitudinal portion 17 of the support frame 3c such that corresponding water can be conducted out of the water gutter 7c into the water-conducting longitudinal portion 17.

The water gutter 7c itself is provided with a base surface 13 from which a plurality of anti-surge bodies 9c which are arranged one behind another in the longitudinal direction, are arranged offset with respect to one another and are in the form of pimples. The pimples serving as anti-surge bodies 9c are formed integrally from the base surface 13 of the water gutter 7c and protrude upward. As can be seen with reference to FIGS. 8 to 10, the anti-surge bodies 9c are oriented obliquely relative to a longitudinal extent of the water gutter 7c, i.e. as seen in the transverse direction of the roof system, wherein the anti-surge bodies are firstly oriented offset with respect to one another in the longitudinal direction in order to form two rows of anti-surge bodies 9c. Secondly, the two rows of anti-surge bodies 9c are oriented in opposite directions, as seen in the longitudinal direction, and obliquely with respect to one another and are in each case arranged with a gap. This means that the anti-surge bodies 9c are not arranged one behind another over a height, but rather along the water gutter 7c. Each anti-surge body 9c is designed in the manner of a curved ridge, wherein the two rows of anti-surge bodies are each curved in opposite directions to one another in an alternating manner. In addition, each anti-surge body 9c has a continuously reducing height toward the discharge 15 in the longitudinal direction of the water gutter 7c, as a result of which the anti-surge bodies 9c are realized in the manner of curved wedge-type ridges.

The discharge 15 defines a nozzle which is in the manner of an elongated hole and the longitudinal extent of which runs parallel to a longitudinal extent of the frame portion 17 of the guide rail arrangement of the support frame 3c.

The invention claimed is:

1. A roof system for a motor vehicle, with a support frame which supports at least one roof element, and with a drainage system which has at least one water gutter, wherein the water gutter is provided at least over part of its length with a plurality of anti-surge bodies which are spaced apart from one another in a longitudinal direction of the water gutter, are each extended over a partial region of a width and/or a height of the water gutter and leave free at least a partial portion of a base of the water gutter, the anti-surge bodies being configured as curved ridges which protrude upwardly from a base surface of the base of the water gutter and are oriented in an alternating manner in different directions.

2. The roof system as claimed in claim 1, wherein the base of the water gutter is carried on continuously in the longitudinal direction of the water gutter on at least one side of each anti-surge body.

3. The roof system as claimed in claim 1, wherein the water gutter is a fixed part of the support frame.

4. The roof system as claimed in claim 1, wherein the water gutter extends along the roof element.

5. The roof system as claimed in claim 1, wherein the curved ridges are oriented obliquely offset with respect to one another in an alternating manner in the longitudinal direction of the base surface of the water gutter.

6. The roof system as claimed in claim 1, wherein the curved ridges are designed as longitudinally extended webs.

7. The roof system as claimed in claim 6, wherein the curved ridges are curved in an opposite direction to one another in an alternating manner.

8. The roof system as claimed in claim 1, wherein the water gutter is provided at an end region thereof with a discharge which is open toward a water-conducting longitudinal portion of a guide rail arrangement of the support frame.

9. The roof system as claimed in claim 8, wherein the discharge on the end region of the water gutter is flanked by an impact wall.

10. The roof system as claimed in claim 4, wherein the water gutter is positioned below and extends beyond a rear end edge of the roof element to trap water accumulated on the roof element.

11. The roof system as claimed in claim 1, wherein the anti-surge bodies are oriented in rows extending along a longitudinal extent of the water gutter.

12. The roof system as claimed in claim 8, wherein at least some of the curved ridges have a wedge-shape with a continuously reducing height in a direction towards the discharge.

\* \* \* \* \*